(12) United States Patent
Ishiyama

(10) Patent No.: US 8,995,014 B2
(45) Date of Patent: Mar. 31, 2015

(54) IMAGE FORMING APPARATUS, NON-TRANSITORY COMPUTER READABLE MEDIUM STORING PROGRAM, AND IMAGE FORMING METHOD

(75) Inventor: Tokihiro Ishiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 386 days.

(21) Appl. No.: 13/345,451

(22) Filed: Jan. 6, 2012

(65) Prior Publication Data

US 2013/0070264 A1 Mar. 21, 2013

(30) Foreign Application Priority Data

Sep. 15, 2011 (JP) ................................ 2011-201652

(51) Int. Cl.
 *G06K 15/00* (2006.01)
 *H04N 1/60* (2006.01)

(52) U.S. Cl.
 CPC .................................. *G06K 15/4065* (2013.01)
 USPC .............. 358/1.9; 358/448; 399/405; 399/81; 399/23; 271/279; 271/145; 271/9.01

(58) Field of Classification Search
 USPC ............... 358/1.9; 271/279, 145; 399/405, 81
 See application file for complete search history.

(56) References Cited

U.S. PATENT DOCUMENTS

| | | | |
|---|---|---|---|
| 6,903,846 B2 * | 6/2005 | Yajima | 358/401 |
| 2002/0024575 A1 | 2/2002 | Sato | |
| 2005/0111015 A1 | 5/2005 | Tsujimoto | |
| 2007/0139695 A1 * | 6/2007 | Young et al. | 358/1.15 |
| 2008/0180721 A1 * | 7/2008 | Ferlitsch | 358/1.15 |

FOREIGN PATENT DOCUMENTS

| | | |
|---|---|---|
| JP | 2005-31970 A | 2/2005 |
| JP | 2006-172342 A | 6/2006 |
| JP | 2006-185013 A | 7/2006 |

OTHER PUBLICATIONS

Office Action issued by Australian Patent Office in corresponding Australian Patent application No. 20122002441, dated Apr. 5, 2013.
Australian Office Action dated Jul. 17, 2014 issued in Australian Patent Application No. 2012200441.
Australian Office Action dated Jun. 19, 2014 issued in Australian Patent Application No. 2012200441.

\* cited by examiner

*Primary Examiner* — Quang N Vo
(74) *Attorney, Agent, or Firm* — Sughrue Mion, PLLC

(57) ABSTRACT

An image forming apparatus includes an image forming section that forms an image on a recording medium, plural recording medium supply sections that supply a recording medium to the image forming section, a recording medium setting section that sets attributes of the recording medium supplied by the recording medium supply section, a function program registration section that makes function programs for executing processes that use processing functions relating to image formation correspond to recording medium attribute information relating to the recording medium usable for the function program and performs registration for each of the function programs, and a control section that controls whether or not the registered function program is executable based on the attributes of the recording medium set by the recording medium setting section and the recording medium attribute information registered by the function program registration section.

16 Claims, 13 Drawing Sheets

FIG.4A

| FUNCTION IDENTIFICATION INFORMATION | | RECORDING MEDIUM ATTRIBUTE INFORMATION | |
|---|---|---|---|
| | | SIZE | MATERIAL |
| 1 | A4 REPORT PRINTING | A4 | (ARBITRARY) |
| 2 | FABRIC PRINTING | (ARBITRARY) | FABRIC TRANSFER SHEET |
| 3 | CATALOG PRINTING | A4, A3, B4 | COATED SHEET |
| 4 | GREEN PRINTING | (ARBITRARY) | NORMAL SHEET, RECYCLED SHEET, AND BACKING SHEET |
| 5 | POSTCARD PRINTING | POSTCARD SIZE | POSTCARD SHEET MATERIAL |
| 6 | APPLICATION FORM PRINTING | APPLICATION FORM SIZE | CARDBOARD |
| 7 | CUSTOMER BROCHURE PRINTING | A4 | COATED SHEET |
| 8 | HOLOGRAPH BOOKBINDING PRINTING | A4, B5 | NORMAL SHEET, RECYCLED SHEET, CARDBOARD, COATED SHEET |
| 9 | OHP SHEET PRINTING | (ARBITRARY) | OHP SHEET |
| 10 | ENVELOPE PRINTING | ENVELOPE SIZE | ENVELOPE MATERIAL |
| 11 | SIMPLE DOUBLE-SIDED PRINTING | (ARBITRARY) | NORMAL SHEET |

FIG.4B

| REGISTERED FUNCTION IDENTIFICATION INFORMATION | | RECORDING MEDIUM ATTRIBUTE INFORMATION | |
|---|---|---|---|
| | | SIZE | MATERIAL |
| 4 | GREEN PRINTING | (ARBITRARY) | NORMAL SHEET, RECYCLED SHEET, AND BACKING SHEET |
| 5 | POSTCARD PRINTING | POSTCARD SIZE | POSTCARD SHEET MATERIAL |
| 11 | SIMPLE DOUBLE-SIDED PRINTING | (ARBITRARY) | NORMAL SHEET |

FIG.5A

| SUPPLY UNIT IDENTIFICATION INFORMATION | RECORDING MEDIUM ATTRIBUTE INFORMATION | |
|---|---|---|
| | SIZE | MATERIAL |
| SUPPLY UNIT #1 | A4 | NORMAL SHEET |
| SUPPLY UNIT #2 | A4 | BACKING SHEET |
| SUPPLY UNIT #3 | POSTCARD SIZE | POSTCARD SHEET MATERIAL |

FIG.5B

| SUPPLY UNIT IDENTIFICATION INFORMATION | RECORDING MEDIUM ATTRIBUTE INFORMATION | |
|---|---|---|
| | SIZE | MATERIAL |
| SUPPLY UNIT #1 | APPLICATION FORM SIZE | CARDBOARD |
| SUPPLY UNIT #2 | A4 | BACKING SHEET |
| SUPPLY UNIT #3 | POSTCARD SIZE | POSTCARD SHEET MATERIAL |

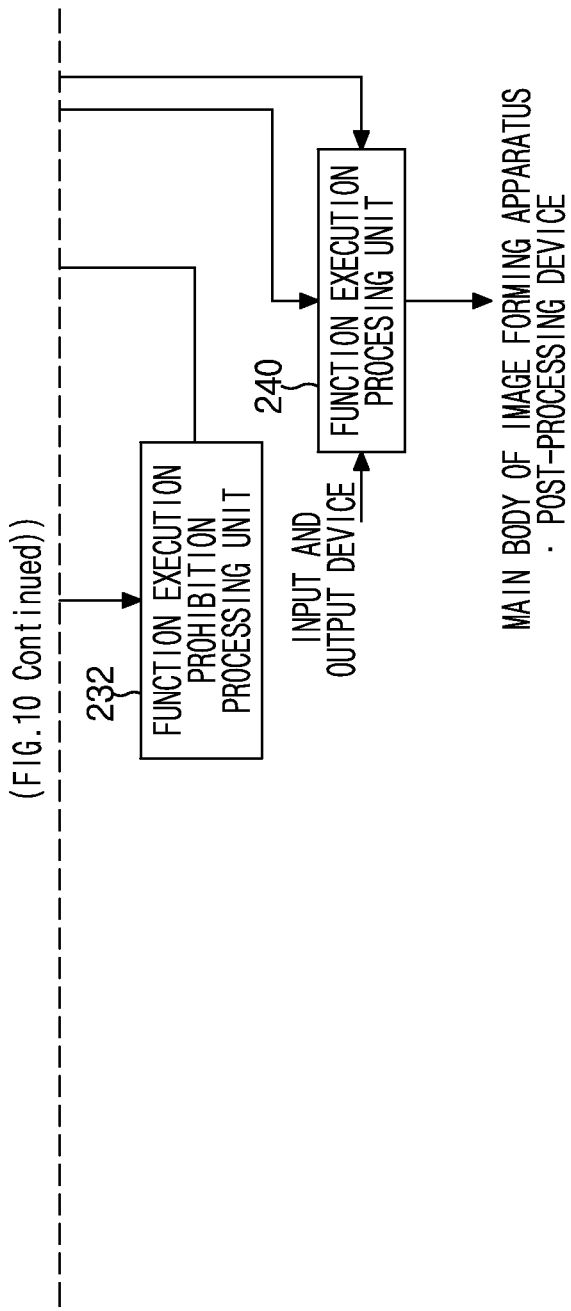

FIG.11

| RECORDING MEDIUM IDENTIFICATION INFORMATION | | RECORDING MEDIUM ATTRIBUTE INFORMATION | |
|---|---|---|---|
| | | SIZE | MATERIAL |
| A | FOR FABRIC PRINTING | A4 | FABRIC TRANSFER SHEET |
| B | FOR POSTCARD PRINTING | POSTCARD SIZE | POSTCARD SHEET MATERIAL |
| C | FOR APPLICATION FORM PRINTING | APPLICATION FORM SIZE | CARDBOARD |
| D | FOR OHP SHEET PRINTING | A4 | OHP SHEET |
| E | FOR ENVELOPE PRINTING | ENVELOPE SIZE | ENVELOPE SHEET MATERIAL |

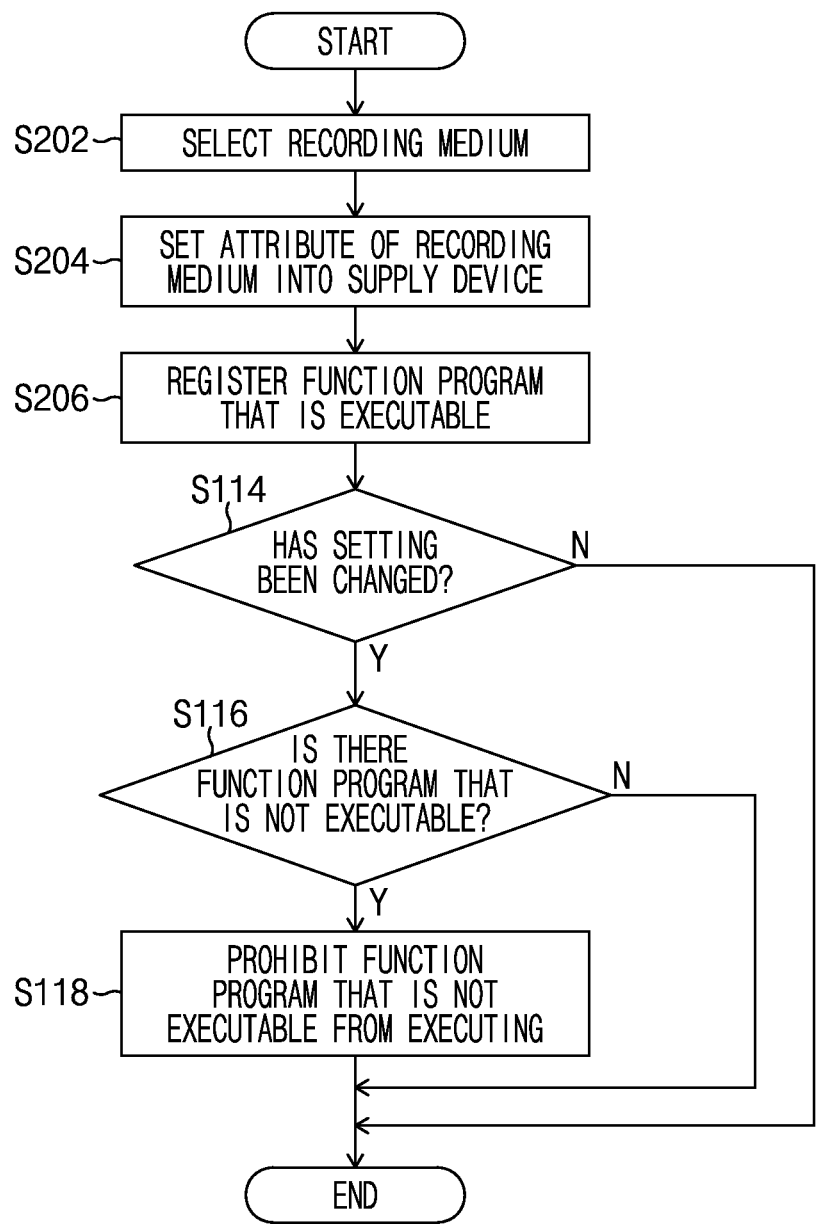

IMAGE FORMING APPARATUS, NON-TRANSITORY COMPUTER READABLE MEDIUM STORING PROGRAM, AND IMAGE FORMING METHOD

CROSS-REFERENCE TO RELATED APPLICATIONS

This application is based on and claims priority under 35 USC 119 from Japanese Patent Application No. 2011-201652 filed Sep. 15, 2011.

BACKGROUND

Technical Field

The present invention relates to an image forming apparatus, a non-transitory computer readable medium storing a program, and an image forming method.

SUMMARY

According to an aspect of the invention, there is provided an image forming apparatus including an image forming section that forms an image on a recording medium, plural recording medium supply sections that supply a recording medium to the image forming section, a recording medium setting section that sets attributes of the recording medium supplied by the recording medium supply section, a function program registration section that makes function programs for executing processes that use processing functions relating to image formation correspond to recording medium attribute information relating to the recording medium usable for the function program and performs registration for each of the function programs, and a control section that controls whether or not the registered function program is executable based on the attributes of the recording medium set by the recording medium setting section and the recording medium attribute information registered by the function program registration section.

BRIEF DESCRIPTION OF THE DRAWINGS

Exemplary embodiments of the present invention will be described in detail based on the following figures, wherein:

FIGS. 4A and 4B are diagrams exemplifying information processed in the image forming program shown in FIG. 3, and FIG. 4A exemplifies function program information and FIG. 4B exemplifies registered function program information;

FIGS. 5A and 5B are diagrams exemplifying recording medium setting information;

FIG. 8A shows a case where a function program that is prohibited from being executed is not displayed and FIG. 8B shows a case where a function program that is prohibited from being executed is displayed separately from execution function programs;

FIG. 11 is a diagram exemplifying recording medium information; and

FIG. 12 is a flowchart showing a process in the image forming program according to the second exemplary embodiment.

DETAILED DESCRIPTION

[Image Forming Apparatus]

Figure 1:
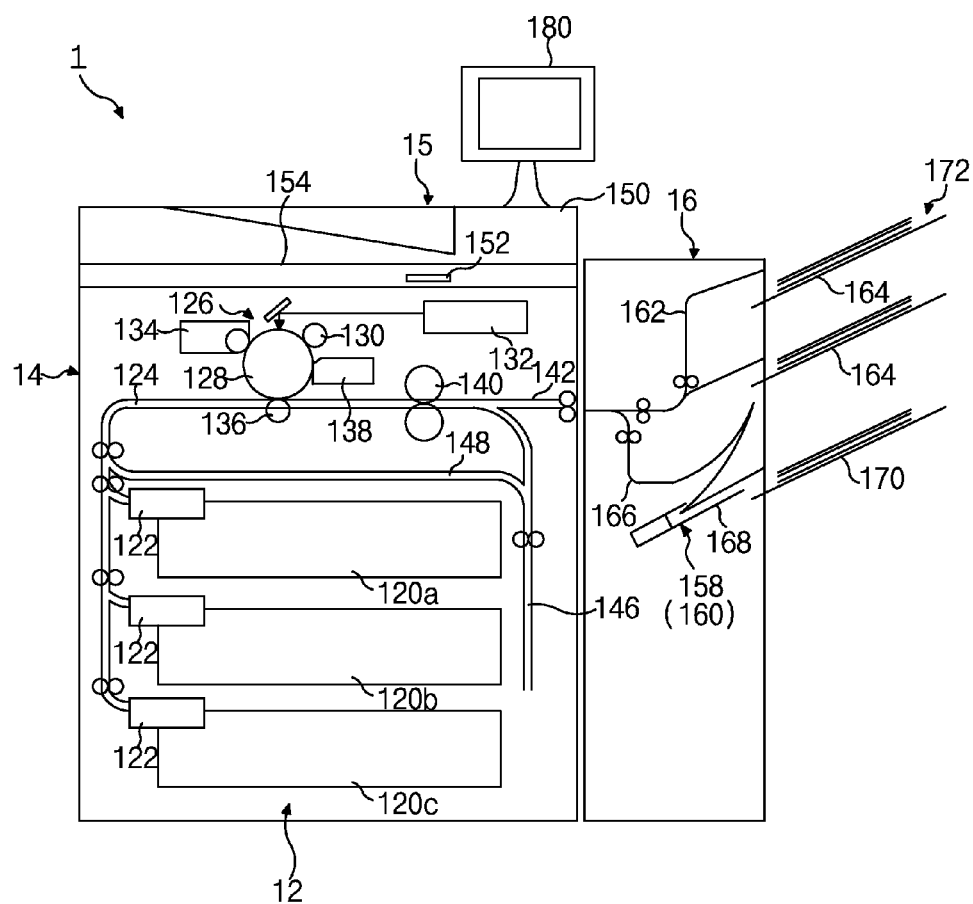
FIG. 1 is a diagram showing a configuration of an image forming apparatus according to an exemplary embodiment of the present invention.

FIG. 1 is a diagram showing a configuration of an image forming apparatus 1 according to an exemplary embodiment.

As shown in FIG. 1, the image forming apparatus 1 includes an image forming device main body 14, an image reading device 15, and a post-processing device 16.

Furthermore, hereinafter, when any one of plural constituent components, for example, supply units 120a to 120c, or the like, is shown without being specified, it may be abbreviated to supply unit 120, or the like.

The image forming device main body 14 includes a supply device 12 having plural (for example, three stages of) supply units 120a to 120c and a manual supply unit (not shown in the drawing), and the supply units 120 are respectively provided with a supply heads 122.

The plural supply units 120 are, for example, trays, and respectively supply recording media such as sheets, of which the sizes, directions, and materials may all be the same, may be different in some respects, or may all be different.

For example, the three-stage supply units 120 respectively supply recording media with sizes of A3, A4, and B5.

Therefore, recording media are supplied to an image forming unit 126 through a recording medium transporting path 124 from one of the supply units 120 selected with an operation of the supply head 122.

As such, the supply units 120 constitute a recording medium supply section.

For example, the image forming unit 126 forms an image configured by xerography on recording media which are transported through the recording medium transporting path 124.

More specifically, the image forming unit 126 includes an image support 128, a charging roll 130 which uniformly charges the surface of the image support 128, a laser writing device 132 which writes a latent image on the image support 128, a developing device 134 which develops the written latent image, a transfer roll 136 which transfers a developed toner image on the recording media, a cleaner 138 which takes off residual toner, and a fixing device 140 which fixes the toner image on the recording media.

Thus, the surface of the image support 128 is uniformly charged by the charging roll 130, a latent image is formed by the laser writing device 132, the latent image is developed by the developing device 134, transferred onto recording media by the transfer roll 136, and fixed by the fixing device 140, and the recording media are output to the post-processing device 16 from a recording medium discharging path 142.

As such, the image forming unit 126 constitutes an image forming section.

When double-sided printing is set, a recording medium one face of which underwent fixing by the fixing device 140 is sent to a reversing device 146 from the recording medium discharging path 142 to be reversed by the reversing device 146, sent to a recording medium reversing path 148, returned to the recording medium transporting path 124 again, and sent to the image forming unit 126 to be subjected to printing on the other face thereof.

The image reading device 15 includes an automatic document feeding device 150 such as an ADF (Automatic Document Feeder), or the like and a scanner 152 which scans a document fed by the automatic document feeding device 150.

The document is fed by the automatic document feeding device 150 to a platen 154, and an image on the document is read by the scanner 152 on the platen 154.

When copying is set in the image forming apparatus 1, an image read by the image reading device 15 is printed by the image forming apparatus main body 14 and copied.

The post-processing device 16 includes, for example, a sorter 172, a stapler 158, and a puncher 160.

The sorter 172 guides the printed recording media that are output from the image forming apparatus main body 14 to a distributing path 162, and distributes plural bins 164.

The stapler 158 guides, one by one, the printed recording media that are output from the image forming apparatus main body 14 to compiler tray 168 through a transporting path 166, a bundle of the recording media piled on the compiler tray 168 is fixed by a needle at a predetermined location thereon, and the recording media are discharged to a stacker 170.

As such, the stapler 158 constitutes a binding section which binds the recording media.

The puncher 160 makes punch holes at predetermined locations of the bundle of the recording media piled on the compiler tray 168, and discharges the media to the stacker 170.

An input and output device 180 includes, for example, a touch panel, and provided on, for example, the upper portion of the image forming apparatus main body 14.

The input and output device 180 is designed to receive an input operation from a user, and to select and display a detailed process of the image forming apparatus main body 14, the image reading device 15, and the post-processing device 16.

Figure 2:
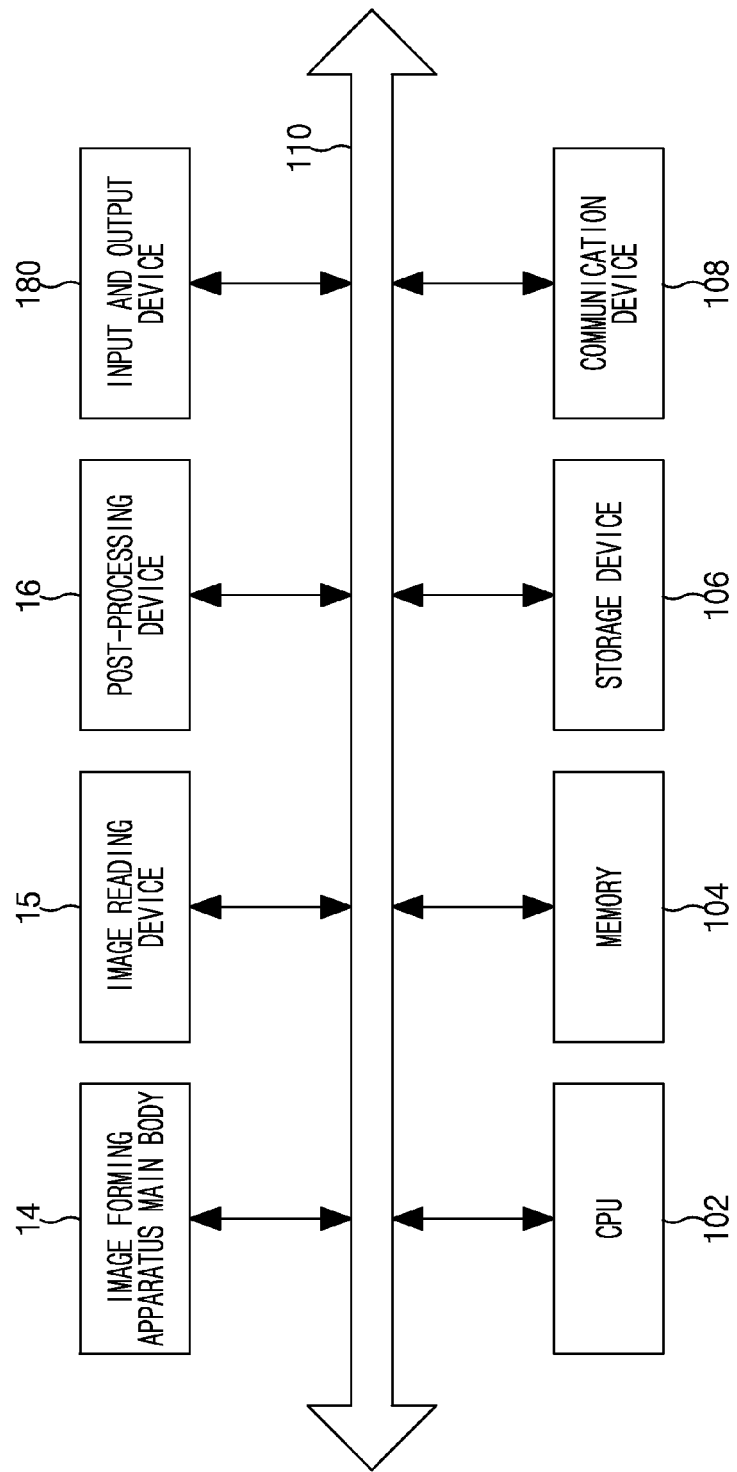
FIG. 2 is a diagram exemplifying a hardware configuration of the image forming apparatus shown in FIG. 1.

FIG. 2 is a diagram exemplifying a hardware configuration of the image forming apparatus 1 shown in FIG. 1.

As shown in FIG. 2, the image forming apparatus 1 includes the image forming apparatus main body 14, the image reading device 15, the post-processing device 16, the input and output device 180, a CPU (Central Processing Unit) 102 that is a processing device, a memory 104, a storage device 106 such as a hard disk drive (HDD), or the like, and a communication device 108 which performs transmission and reception of data with an external computer, or the like.

These constituent elements are connected to one another via a bus 110.

In short, the image forming apparatus 1 includes a hardware-constituting portion as a computer which enables information processing and communication with other computers.

[First Exemplary Embodiment]

Figure 3:
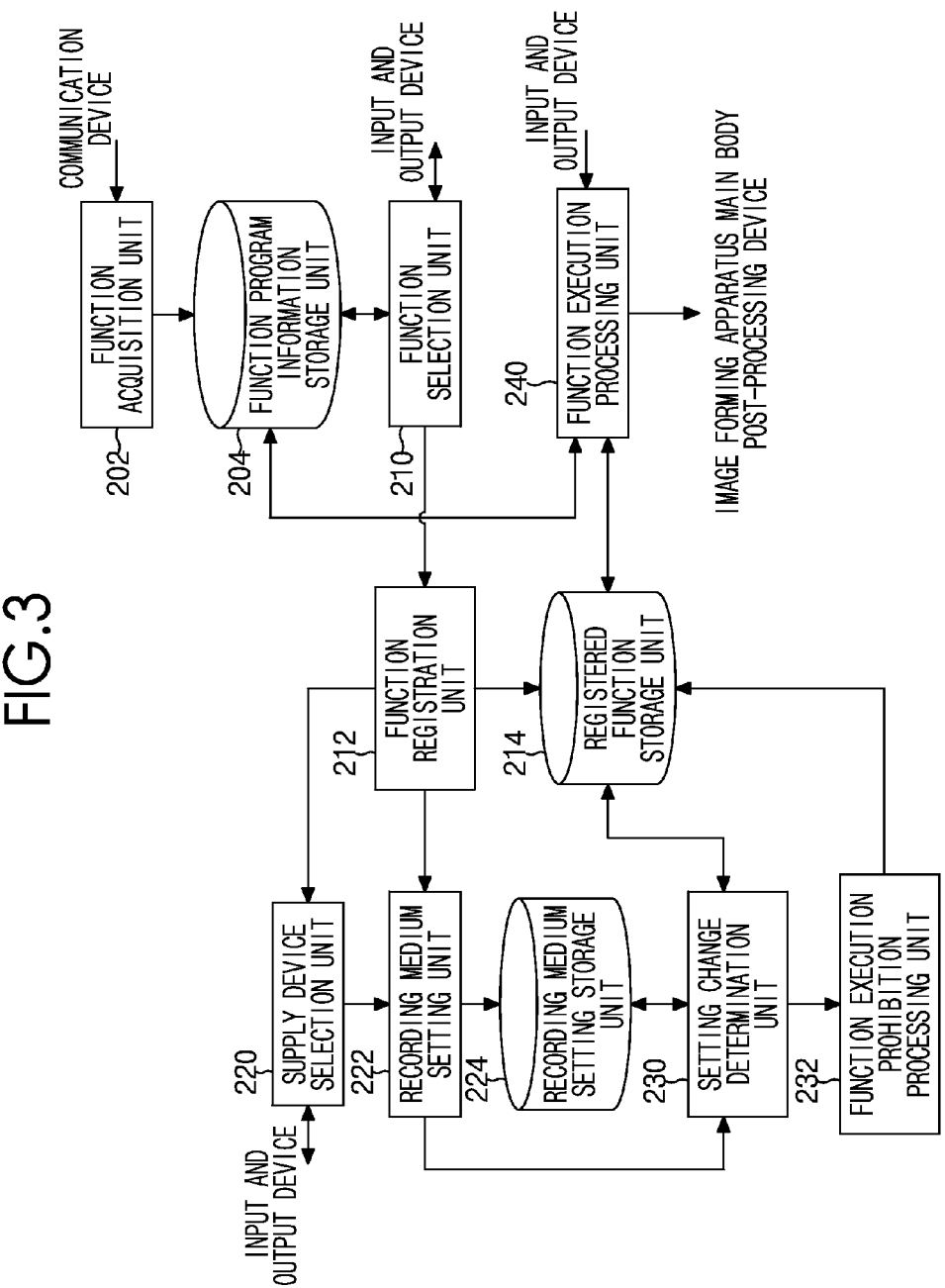
FIG. 3 is a diagram showing a configuration of an image forming program according to a first exemplary embodiment executed by the image forming apparatus shown in FIG. 1.

FIG. 3 is a diagram showing a configuration of an image forming program 20 according to a first exemplary embodiment executed by the image forming apparatus 1 shown in FIG. 1.

As shown in FIG. 3, the image forming program 20 includes a function acquisition unit 202, a function program information storage unit 204, a function selection unit 210, a function registration unit 212, a registered function storage unit 214, a supply device selection unit 220, a recording medium setting unit 222, a recording medium setting storage unit 224, a setting change determination unit 230, a function execution prohibition processing unit 232, and a function execution processing unit 240.

The image forming program 20 is stored in, for example, the memory 104 and supplied to the image forming apparatus 1, and executed on the OS (not shown in the drawing) of the image forming apparatus 1, practically using hardware resources of the image forming apparatus 1 (the same is applied to each program below (including a function program)).

In addition, the same reference numerals are given to the substantially same constituent elements and processes in each drawing shown below.

FIGS. 4A and 4B are diagrams exemplifying information processed in the image forming program 20 shown in FIG. 3, and FIG. 4A exemplifies information saved in the function program information storage unit 204 and FIG. 4B exemplifies information saved in the registered function storage unit 214.

FIGS. 5A and 5B are diagrams exemplifying information saved in the recording medium setting storage unit 224 shown in FIG. 3.

In the image forming program 20, the function acquisition unit 202 acquires a function program (application program) to execute various processing functions (for example, an image forming process, a double-sided printing process, and a post-processing) of the image forming apparatus 1 to form images on a recording medium via, for example, a network by the communication device 10, and stores information indicating the function program (function program information) to the function program information storage unit 204.

Furthermore, the function acquisition unit 202 may acquire a function program through a storage medium (not shown in the drawing) such as a memory card, or the like.

In addition, the image forming apparatus 1 may execute a function relating to a function program not only by causing the function acquisition unit 202 to acquire the function, but may execute a function by causing the function registration unit 212, which will be described later, to register the function program therein.

A registered function program may be displayed on the menu screen by a process of the function execution processing unit 240, which will be described later, in an executable state with processing functions such as copying, fax, scanning, or the like which are prepared in the image forming apparatus 1 in advance.

Furthermore, in the description hereinbelow, "function" used alone refers to a function executed by the function program, and "processing function" refers to a function including an image forming process, a double-sided printing process, a post-processing, and the like, which are originally prepared in the image forming apparatus 1.

FIG. 4A is a diagram exemplifying function program information saved in the function program information storage unit 204.

As shown in FIG. 4A, the function program information includes function identification information which is identification information of the function program and recording medium attribute information which shows attributes of a recording medium (recording medium attributes) usable in the function program.

As shown in FIG. 4A, the function identification information is made to correspond to the recording medium attribute information usable in the function program in the function program information.

Function identification information "A4 report printing" indicates a function program to execute a process for printing a report, which indicates detailed settings (for example, an identifier of the image forming apparatus 1 or the like) indicating a setting item selected by making a user select a setting item that he or she wants to output among plural settings relating to the image forming apparatus 1 and a setting value thereof, on one or both sides of an A4-sized recording medium (hereinafter, which may be referred to as "function program 'A4 report printing'").

The function program indicated by the function identification information "A4 report printing" has an arbitrary material, but may use A4-sized recording media.

In other words, the function program indicated by the function identification information "A4 report printing" is not executable when a recording medium having a recording medium attribute that the "size" is A4 is not accommodated in any of the supply units 120.

Function identification information "fabric printing" indicates a function program to perform an image processing for image data which is stored in the storage device 106 of the image forming apparatus 1 or image data which is stored in a computer connected to the image forming apparatus 1 via a network to be appropriate for a fabric, and to execute a process for printing the image data, which underwent the image processing, on a fabric transfer sheet (hereinafter, which may be referred to as "function program 'fabric printing'").

The function program indicated by the function identification information "fabric printing" may be configured such that the input and output device 180 displays a selection screen for selecting image data, or that a user selects desired image data using the selection screen.

In addition, the function program indicated by the function identification information "fabric printing" may use a recording medium of which the size is arbitrary, but the material is a fabric transfer sheet.

In other words, the function program indicated by the function identification information "fabric printing" is not executable when no recording medium having the recording medium attribute that the "material" is a fabric transfer sheet is accommodated in any of the supply units 120.

Function identification information "catalog printing" indicates a function program to execute a process for printing a catalog on a coated sheet in a specific size (hereinafter, which may be referred to as "function program 'catalog printing'").

The function program indicated by the function identification information "catalog printing" may use a recording medium of which the size is A4, A3, or B4, and the material is a coated sheet.

In other words, the function program indicated by the function identification information "catalog printing" is not executable when no recording medium having the recording medium attribute that the "size" is A4, A3, or B4, and the "material" is a coated sheet is accommodated in any of the supply units 120.

Function identification information "green (eco-friendly) printing" (hereinafter referred to as 'green printing') indicates a function program to execute a process of double-sided printing in which two pages are printed on single sides of a normal sheet or a recycled sheet (in other words, four pages are printed on one sheet of a recording medium), and two pages are printed on the front surface of a backing sheet (hereinafter, this may be referred to as "function program 'green printing'").

The function program indicated by the function identification information "green printing" may use a recording medium of which the size is arbitrary, but the material is a normal sheet, a recycled sheet, or a backing sheet.

In other words, the function program indicated by the function identification information "green printing" is not executable when no recording medium having the recording medium attribute that the "material" is a normal sheet, a recycled sheet, or a backing sheet is accommodated in any of the supply units 120.

Function identification information "postcard printing" indicates a function program to perform processing for image data which is stored in the storage device 106 of the image forming apparatus 1 or image data which is stored in a computer connected to the image forming apparatus 1 via a network to be printed on a postcard (hereinafter, which may be referred to as "function program 'postcard printing'").

The function program indicated by the function identification information "postcard printing" may be configured such that the input and output device 180 displays a selection screen for selecting image data, or that a user selects desired image data using the selection screen.

Furthermore, the function program indicated by the function identification information "postcard printing" may be configured such that the input and output device 180 displays an address input screen for inputting the address of the addressee of the postcard, or the like, so that the user inputs the address, or the like, using the address input screen, and the function program indicated by the function identification information "postcard printing" may be configured such that the input address is printed on the postcard.

In addition, the function program indicated by the function identification information "postcard printing" may use a postcard as a recording medium.

In other words, the function program indicated by the function identification information "postcard printing" is not executable when no recording medium having the recording medium attributes that the "size" is that of a postcard and the "material" is that of a postcard is accommodated in any of the supply units 120.

Function identification information "application form printing" indicates a function program to execute a process for printing an application form necessary for procedures in a hospital, or the like (hereinafter, which may be referred to as "function program 'application form printing'").

The function program indicated by the function identification information "application form printing" may use a recording medium of which the size is for an application form and the material is cardboard.

In other words, the function program indicated by the function identification information "application form printing" is not executable when no recording medium having the recording medium attributes that the "size" is for an application form and the "material" is a cardboard material is accommodated in any of the supply units 120.

Function identification information "customer brochure printing" indicates a function program to execute a process in which recording media that are A4-sized coated sheets undergo printing and are bound by the post-processing device 16 in order to make an A5-sized brochure (hereinafter, which may be referred to "function program 'customer brochure printing'").

The function program indicated by the function identification information "customer brochure printing" may use a recording medium of which the size is A4 and the material is a coated sheet.

In other words, the function program indicated by the function identification information "customer brochure printing" is not executable when no recording medium having the recording medium attributes that the size is A4 and the material is a coated sheet is accommodated in any of the supply units 120.

Function identification information "holograph bookbinding printing" indicates a function program to execute a process in which A4-sized or B5-sized recording media undergo printing and are bound by the post-processing device 16 in order to make an A5-sized booklet (A4 saddle-stitch) or a B6-sized booklet (B5 saddle-stitch) (hereinafter, which may be referred to as "function program 'holograph bookbinding printing'").

The function program indicated by the function identification information "holograph bookbinding printing" may use a recording medium of which the size is A4 or B5, and the material is that of a normal sheet, a recycled sheet, a cardboard sheet, or a coated sheet.

In other words, the function program indicated by the function identification information "holograph bookbinding printing" is not executable when no recording medium having the recording medium attributes that the "size" is A4 or B5 and the "material" is that of a normal sheet, a recycled sheet, a cardboard sheet, or a coated sheet is accommodated in any of the supply units 120.

Function identification information "OHP sheet printing" indicates a function program to execute a process for printing images on an OHP sheet (hereinafter, which may be referred to as "function program 'OHP sheet printing'").

The function program indicated by the function identification information "OHP sheet printing" may use a recording medium of which the size is arbitrary and the material is an OHP sheet.

In other words, the function program indicated by the function identification information "OHP sheet printing" is not executable when no recording medium having the recording medium attribute that the "material" is that of an OHP sheet is accommodated in any of the supply units 120.

Function identification information "envelope printing" indicates a function program to execute a process for performing printing on an envelope (hereinafter, which may be referred to as "function program 'envelope printing'").

The function program indicated by the function identification information "envelope printing" may use a recording medium which is an envelope.

In other words, the function program indicated by the function identification information "envelope printing" is not executable when no recording medium having the recording medium attributes that the "size" is that of an envelope and the "material" is an envelope sheet material is accommodated in any of the supply units 120.

Function identification information "simple double-sided printing" indicates a function program to execute a process of performing printing on both sides of a normal sheet (hereinafter, which may be referred to as "function program 'simple double-sided printing'").

The function program indicated by the function identification information "simple double-sided printing" is configured such that double-sided printing is performed without setting by the user, and that double-sided printing may be performed simply by, for example, causing the input and output device 180 to display only a "start button" and by the user pressing the "start button".

The function program indicated by the function identification information "simple double-sided printing" may use a recording medium of which the size is arbitrary and the material is that of a normal sheet.

In other words, the function program indicated by the function identification information "simple double-sided printing" is not executable when no recording medium having the recording medium attribute that the "material" is that of a normal sheet is accommodated in any of the supply units 120.

Furthermore, when usable recording medium attribute information is included in an acquired function program, the function acquisition unit 202 may extract the recording medium attribute information to make a correspondence between the extracted recording medium attribute information and the function identification information, and cause the function program information storage unit 204 to store the information.

On the other hand, when usable recording medium attribute information is not included in an acquired function program, the function acquisition unit 202 may analyze the function program to acquire recording medium attribute information.

Specifically, for example, when usable recording medium attribute information is not included in the function program "postcard printing", the function acquisition unit 202 may generate recording medium attribute information corresponding to a "postcard" recording medium when the function acquisition unit 202 analyzes the function program "postcard printing" and then recognizes that the function program "postcard printing" may use only postcards.

In addition, the function acquisition unit 202 may make a correspondence between usable recording medium attribute information and function identification information indicating the acquired function program based on prohibition information set in the image forming apparatus 1 in advance when the usable recording medium attribute information is made to correspond to function identification information indicating the acquired function program.

Specifically, for example, when the image forming apparatus 1 is set to certainly perform double-sided printing, for prohibition information, a recording medium not usable for double-sided printing (for example, an OHP sheet) is set as prohibition information.

In this case, the function acquisition unit 202 may make recording medium attribute information from which a recording medium not usable for the double-sided printing is removed correspond to the acquired function program.

In addition, the function identification information indicating the acquired function program and the usable recording medium attribute information may be made to correspond to each other by a manual operation of the user.

Specifically, for example, when the function program is acquired (in particular, when it is not possible to acquire recording medium attribute information even after the function program is analyzed), the function acquisition unit 202 may cause the input and output device 180 to display a setting screen of the recording medium attribute information to set the recording medium attribute information by an operation of the user, and then make the set recording medium attribute information correspond to the function program.

In addition, the function acquisition unit 202 may make unusable recording medium attribute information correspond to a function program (particularly in the above-described manual setting).

The function selection unit 210 receives an operation of the input and output device 180 by the user to select a registered function program, and outputs the selection result to the function registration unit 212.

Figure 6:
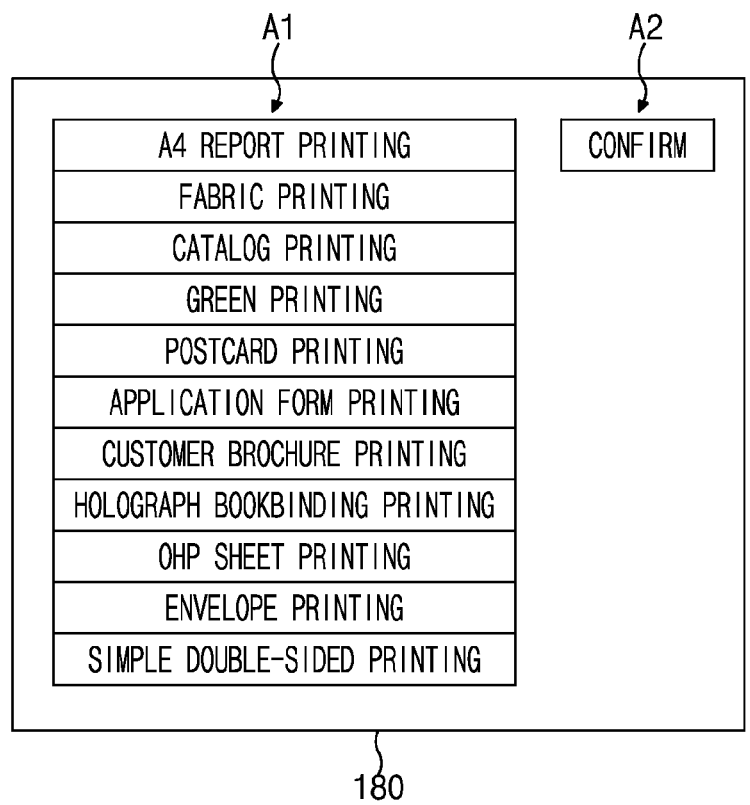
FIG. 6 is a diagram exemplifying a registered function selection screen displayed in an input and output device by a function selection unit.

Specifically, the function selection unit 210 extracts function program information from the function program information storage unit 204, causes the input and output device 180 to display a registered function selection screen shown in FIG. 6, and then receives a selection operation of the user using the registered function selection screen.

FIG. 6 is a diagram exemplifying a registered function selection screen displayed in the input and output device 180 by the function selection unit 210.

On the registered function selection screen, a selection button A1 for selecting each function program and a confirmation button A2 are displayed.

When the user presses down the selection button A1 on the input and output device 180 one or plural times, the color of the selection button A1 indicating the selected function program is highlighted, and when the user presses down the confirmation button A2, the function selection unit 210 generates a selection result including function program information relating to the selected function program.

For example, when the user presses down the selection button A1 indicating "green printing", the color of the selection button A1 indicating "green printing" is highlighted, and when the user presses down the confirmation button A2, the function selection unit 210 generates a selection result including function program information relating to "green printing".

The function registration unit 212 performs a process for registering the function program corresponding to function program information included in the selection result received from the function selection unit 210 so as to be executable by the image forming apparatus 1, and stores registered function program information relating to the registered function program (registered function program) in the registered function storage unit 214.

In addition, the function registration unit 212 outputs a signal indicating that a registration process has been performed to the supply device selection unit 220.

Furthermore, the function registration unit 212 outputs recording medium attribute information indicating recording medium attributes usable in the registered function program to the recording medium setting unit 222.

FIG. 4B is a diagram exemplifying the registered function program information stored in the registered function storage unit 214.

As shown in FIG. 4B, the registered function program information includes registered function identification information which is identification information of a registered function program and recording medium attribute information indicating attributes of a recording medium usable in the registered function program.

As shown in FIG. 4B, in the registered function program information, registered function identification information is made to correspond to recording medium attribute information usable in the registered function program.

FIG. 4B shows the function program "green printing", the function program "postcard printing", and the function program "simple double-sided printing" which have been registered, among the function programs stored in the function program information storage unit 204.

The supply device selection unit 220 receives an operation of the input and output device 180 by the user to select a supply unit 120 corresponding to a registered function program, and outputs the selection result to the recording medium setting unit 222.

Figure 7:
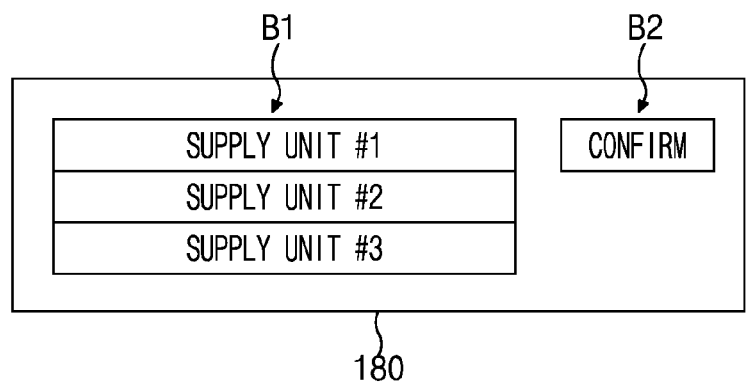
FIG. 7 is a diagram exemplifying a supply unit selection screen displayed in the input and output device by a supply device selection unit.

Specifically, the supply device selection unit 220 causes the input and output device 180 to display a supply unit selection screen shown in FIG. 7, and receives a selection operation by the user using the supply unit selection screen.

FIG. 7 is a diagram exemplifying the supply unit selection screen displayed in the input and output device 180 by the supply device selection unit 220.

The supply unit selection screen displays a selection button B1 for selecting each of supply units #1 to #3 and a confirmation button B2.

When the user presses down the selection button B1 on the input and output device 180, the color of the selection button B1 indicating a selected supply unit is highlighted, and when the user presses down the confirmation button B2, the supply device selection unit 220 generates a selection result including identification information of the selected supply unit 120 (supply unit identification information).

The recording medium setting unit 222 sets a recording medium attribute usable in a registered function program registered by the function registration unit 212 for the supply unit 120 selected by the supply device selection unit 220.

Specifically, the recording medium setting unit 222 makes supply unit identification information included in the selection result from the supply device selection unit 220 correspond to recording medium attribute information from the function registration unit 212.

Then, the recording medium setting unit 222 stored recording medium setting information (in FIGS. 5A and 5B) indicating the correspondence of the supply unit identification information and the recording medium attribute information in the recording medium setting storage unit 224.

Herein, when plural elements are included in one attribute in the recording medium attribute information from the function registration unit 212, the recording medium setting unit 222 may receive, from the input and output device 180, an operation of the user for selecting one from the plural elements.

For example, in the registered function program information exemplified in FIG. 4B, the attribute "material" of the recording medium attribute information corresponding to the function program "green printing" includes three elements of a "normal sheet", a "recycled sheet", and a "backing sheet".

In this case, the recording medium setting unit 222 may cause the input and output device 180 to display a screen for selecting which element among the "normal sheet", the "recycled sheet", and the "backing sheet" is set in regard to the attribute "material".

FIGS. 5A and 5B are diagrams exemplifying the recording medium setting information stored in the recording medium setting storage unit 224.

As shown in FIGS. 5A and 5B, the recording medium setting information includes supply unit identification information which is identification information of the supply units 120 and recording medium attribute information.

As shown in FIGS. 5A and 5B, in the recording medium setting information, a selected supply unit 120 is made to correspond to recording medium attributes set for the supply unit 120.

For example, in the recording medium setting information exemplified in FIG. 5A, an "A4 size" is set as the attribute "size, and a "normal sheet" is set as the attribute "material" for the "supply unit #1".

When the registered function program information exemplified in FIG. 4B is stored in the registered function storage unit 214, and the recording medium setting information exemplified in FIG. 5A is stored in the recording medium setting storage unit 224, the registered function program "green printing" may use recording medium attribute relating to the supply units #1 and #2.

In addition, the registered function program "postcard printing" may use recording medium attributes relating to the supply unit #3.

In addition, the registered function program "simple double-sided printing" may use recording medium attributes relating to the supply unit #1.

Furthermore, in the above-described exemplary embodiment, the recording medium setting unit 222 is designed to automatically set recording medium attributes according to the recording medium attribute information received from the function registration unit 212, but when an element of an attribute is "arbitrary" particularly in, for example, the registered function program "green printing", or the like of FIG. 4B, the recording medium setting unit 222 may set recording medium attributes in a manual operation by receiving an input of an element of recording medium attributes obtained from the operation of the input and output device 180 by the user.

In addition, in the above-described exemplary embodiment, the recording medium setting unit 222 is designed to set recording medium attributes after the function registration unit 212 registers a function program, but priority may be given to either of the process of the function registration unit 212 or that of the recording medium setting unit 222.

The user accommodates a recording medium corresponding to the recording medium attributes set by the recording medium setting unit 222 in the set supply unit 120.

When the recording medium setting unit 222 changes the setting of a recording medium attribute, the setting change determination unit 230 determines whether or not there is a function program which is not executable for the changed recording medium attribute.

Specifically, when the recording medium setting unit 222 changes the setting of a recording medium attribute, the setting change determination unit 230 extracts registered function program information from the registered function storage unit 214 and extracts changed recording medium setting information from the recording medium setting storage unit 224.

The setting change determination unit 230 checks recording medium attribute information relating to the registered function program and recording medium attribute information included in the changed recording medium setting information for each registered function program of the extracted registered function program information.

When there is recording medium attribute information of the recording medium setting information which coincides with recording medium attribute information relating to the registered function program as a result of the checking, the setting change determination unit 230 determines that there is a supply unit 120 for the recording medium attribute information corresponding to the registered function program, and in such a case, finishes the process for the registered function program.

On the other hand, when there is no recording medium attribute information of the recording medium setting information which coincides with recording medium attribute information relating to the registered function program as a result of the checking, the setting change determination unit 230 determines that there is no supply unit 120 for the recording medium attribute information corresponding to the registered function program.

In such a case, the setting change determination unit 230 outputs registered function identification information relating to the registered function program to the function execution prohibition processing unit 232.

An example will be described in detail, in which the registered function program relates to the registered function program information shown in FIG. 4B, and the recording medium setting unit 222 changes the setting of recording medium attributes as shown in FIG. 5B from the setting of FIG. 5A.

In this example, the recording medium attribute information relating to the supply unit #1 is changed in the recording medium setting information (the attribute "size" is changed to an "application form size" from an "A4 size" and the "material" is changed to a "cardboard" from a "normal sheet").

In this case, the setting change determination unit 230 first checks recording medium attribute information relating to the registered function program "green printing" and recording medium attribute information relating to each of the supply units #1 to #3.

Since the attribute "size" is "arbitrary", the setting change determination unit 230 searches for recording medium attribute information of which the attribute "material" is a "normal sheet", a "recycled sheet", or a "backing sheet" in the recording medium setting information.

In this case, since the attribute "material" of the recording medium attribute information relating to the supply unit #2 is a "backing sheet", the setting change determination unit 230 determines that there is a supply unit 120 (supply unit #2) relating to the recording medium attribute information corresponding to the registered function program "green printing".

Next, the setting change determination unit 230 checks recording medium attribute information relating to the registered function program "postcard printing" and the recording medium attribute information relating to each of the supply units #1 to #3.

The setting change determination unit 230 searches recording medium attribute information of which the attribute "size" is a "postcard size" and the attribute "material" is a "postcard sheet material" in the recording medium attribute information.

In this case, since the attribute "size" of the recording medium attribute information relating to the supply unit #3 is a "postcard size" and the attribute "material" thereof is a "postcard sheet material", the setting change determination unit 230 determines that there is a supply unit 120 (supply unit #3) relating to the recording medium attribute information corresponding to the registered function program "postcard printing".

Next, the setting change determination unit 230 checks recording medium attribute information relating to the registered function program "simple double-sided printing" and the recording medium attribute information relating to each of the supply units #1 to #3.

Since the attribute "size" is "arbitrary", the setting change determination unit 230 searches recording medium attribute information of which the attribute "material" is a "normal sheet" in the recording medium attribute information.

In this case, since the attribute "size" is not a "normal sheet" in all of the recording medium attribute information relating to the supply units #1 to #3, the setting change determination unit 230 determines that there is no supply unit 120 relating to the recording medium attribute information corresponding to the registered function program "simple double-sided printing".

Therefore, the setting change determination unit 230 outputs registered function identification information of the registered function program "simple double-sided printing" to the function execution prohibition processing unit 232.

The function execution prohibition processing unit 232 processes the registered function program relating to the registered function identification information received from the setting change determination unit 230 so as not to be executable by the function execution processing unit 240.

Specifically, the function execution prohibition processing unit 232 deletes the registered function program information relating to the registered function identification information received from the setting change determination unit 230 from the registered function storage unit 214.

Alternatively, the function execution prohibition processing unit 232 sets an execution prohibition flag to the registered function program information relating to the registered function identification information received from the setting change determination unit 230.

In the case of the example described above using FIG. 5B, the function execution prohibition processing unit 232 deletes the registered function program information of the registered function program "simple double-sided printing" from the registered function storage unit 214, or sets the execution prohibition flag to the registered function program information of the registered function program "simple double-sided printing".

The function execution processing unit 240 activates a function program designed by the user to perform a process for executing the function program, and controls the image forming apparatus main body 14 and the post-processing device 16 in order to execute the function program.

Specifically, the function execution processing unit 240 receives an instruction of performing a printing process using the function program from the user operating the input and output device 180.

In addition, the function execution processing unit 240 causes the input and output device 180 to display a screen to help the user to select registered function identification information relating to each piece of the registered function program information stored in the registered function storage unit 214 (an execution function selection screen, which is, for example, a menu screen).

Figure 8A:
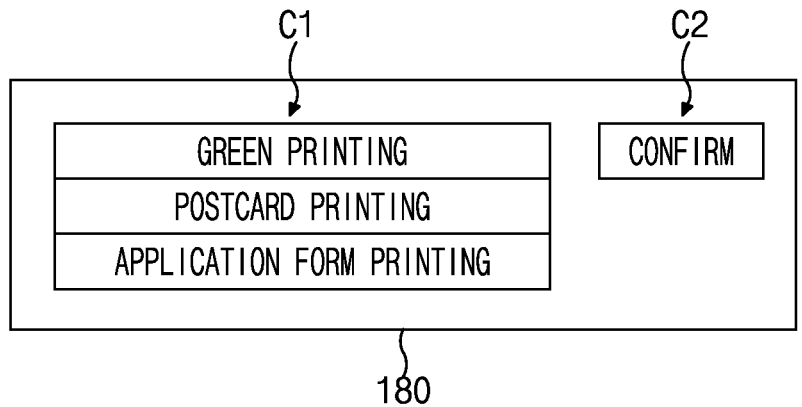
FIGS. 8A and 8B are diagrams exemplifying an execution function selection screen displayed in the input and output device by a function execution processing unit.
Figure 8B:
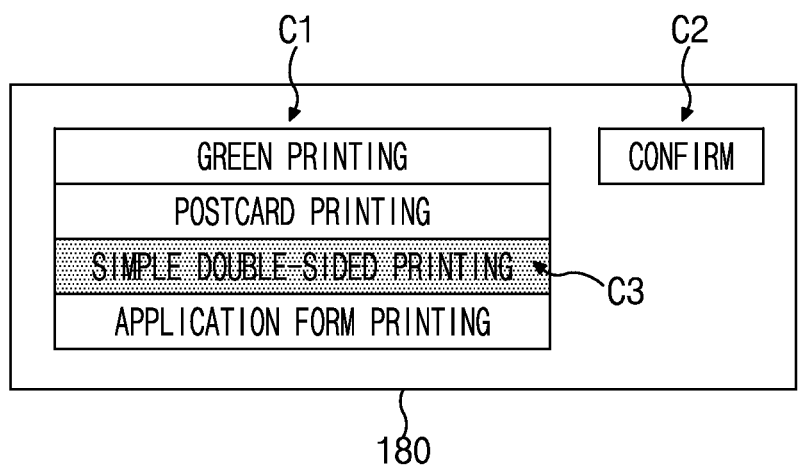

FIGS. 8A and 8B are diagrams exemplifying the execution function selection screen displayed in the input and output device 180 by the function execution processing unit 240, and FIG. 8A shows a case where a function program that is prohibited from being executed is not displayed and FIG. 8B shows a case where a function program that is prohibited from being executed is displayed separately from execution function programs.

On the execution function selection screen, a selection button C1 for selection a function program to be executed and a confirmation button C2 are displayed.

When the user presses down the selection button C1 on the input and output device 180, the color of the selection button C1 indicating a selected function program is highlighted, and when the user presses down the confirmation button C2, the function execution processing unit 240 controls the image forming apparatus main body 14 and the post-processing device 16 in order to execute the selected function program.

In the case of the example described above using FIG. 5B, the registered function program "simple double-sided printing" is prohibited from being executed.

Herein, when the registered function program information of the registered function program "simple double-sided printing" is deleted from the registered function storage unit 214 by the function execution prohibition processing unit 232, function program information relating to the function program "simple double-sided printing" is not stored in the registered function storage unit 214, and thus, the selection button C1 indicating the function program "simple double-sided printing" is not displayed on the execution function selection screen as shown in FIG. 8A.

On the other hand, when an execution prohibition flag is set to the registered function program information of the registered function program "simple double-sided printing" by the function execution prohibition processing unit 232, the selection button C1 indicating the function program "simple double-sided printing" may not be displayed as shown in FIG. 8A, and the color of the selection button C1 indicating the function program "simple double-sided printing" may be displayed separately from other executable functions as shown by C3 of FIG. 8B.

In addition, when the user presses down the function program "simple double-sided printing" in the display as shown in FIG. 8B, the input and output device 180 may display recording medium attributes that should be set to make the function executable.

For example, the function execution prohibition processing unit 232 may cause the input and output device 180 to display notifications to the effect that "the function program is not executable" and "please place normal sheets in the supply units".

Figure 9:
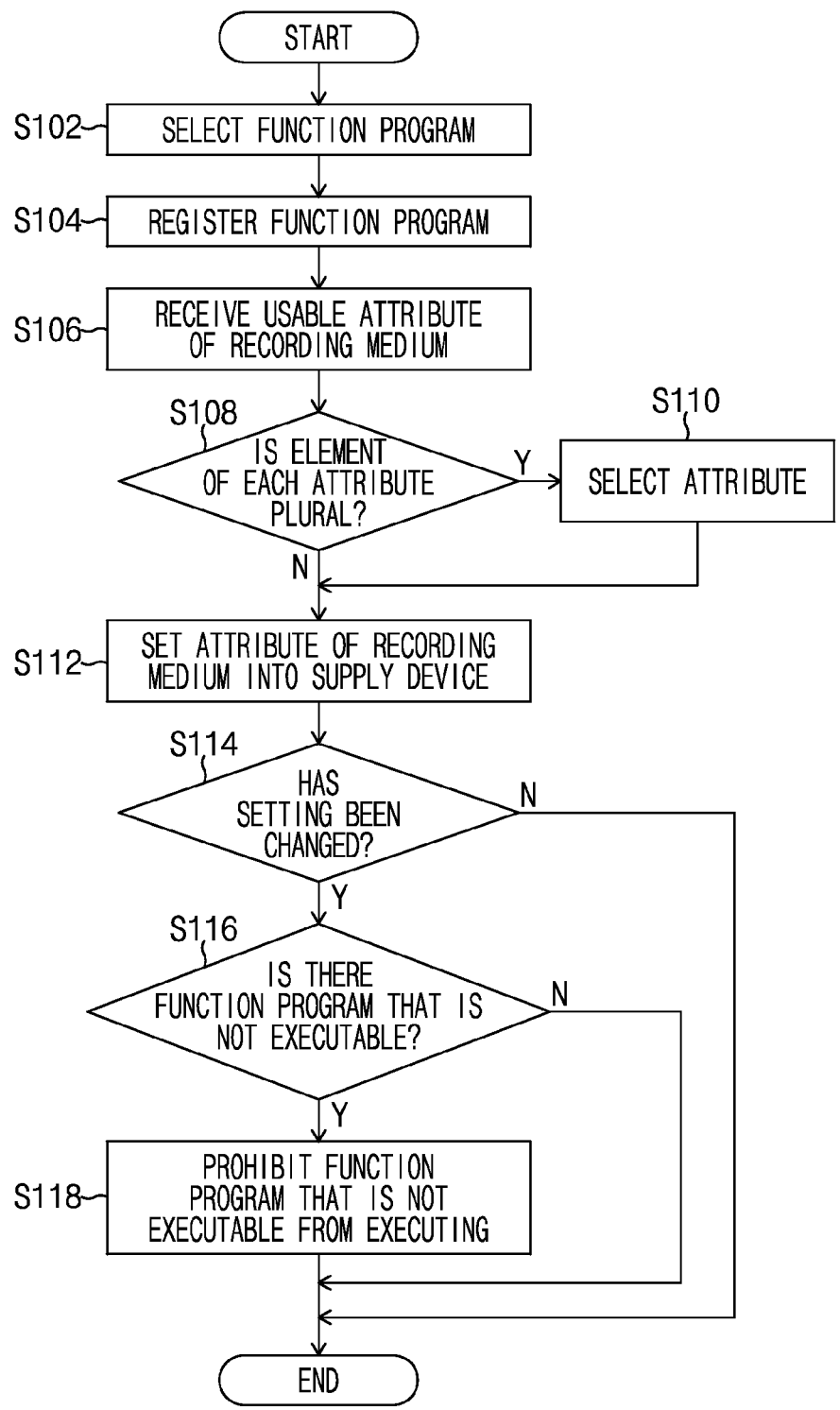
FIG. 9 is a flowchart showing a process in the image forming program according to the first exemplary embodiment.

FIG. 9 is a flowchart (S10) showing a process in the image forming program 20 according to the first exemplary embodiment.

Furthermore, order of steps shown below may be appropriately changed, and not all of the steps are necessary (the same applies to the flowcharts, and the like shown below).

In Step 102 (S102), the function selection unit 210 selects a function to be registered by receiving an operation of the input and output device 180 from a user.

In Step 104 (S104), the function registration unit 212 performs a process for registering the selected function program so as to be executable in the image forming apparatus 1.

In Step 106 (S106), the recording medium setting unit 222 receives recording medium attributes usable in registered function programs from the function registration unit 212.

In Step 108 (S108), the recording medium setting unit 222 determines whether or not one attribute includes plural elements for the recording medium attributes usable in the registered function programs, and when the answer is positive, the process advances to S110, and when the answer is negative, the process advances to S112.

In Step 110 (S110), the recording medium setting unit 222 receives, from the input and output device 180, an operation of the user to select one of the plural elements of the attribute.

In Step 112 (S112), the recording medium setting unit 222 sets the recording medium attributes usable in the registered function program in a selected supply unit 120.

In Step 114 (S114), the setting change determination unit 230 determines whether or not setting of the recording medium attributes has been changed by the recording medium setting unit 222, and when the setting has been changed, the process advances to S116, and when the setting has not been changed, the process ends.

In Step 116 (S116), the setting change determination unit 230 determines whether or not there is a function program that is not executable for the changed recording medium attributes, and when the answer is positive, the process advances to S118, and when the answer is negative, the process ends.

In Step 118 (S118), the function execution prohibition processing unit 232 processes the function program which has been determined to be not executable so as not to be executed by the function execution processing unit 240.

Furthermore, in the above-described exemplary embodiment, the function acquisition unit 202, the function selection unit 210, and the function registration unit 212 are respectively described for individual processes, but when the function acquisition unit 202 acquires function programs, it may be configured such that all of the acquired function programs are registered, and function program information relating to the acquired function programs is stored in the registered function storage unit 214 as registered function program information.

In this case, the function selection unit 210 may not be necessary, and the function acquisition unit 202 and the function registration unit 212 may be realized in a series of processes.

In addition, in that case, the function program information storage unit 204 may not be necessary.

[Second Exemplary Embodiment]

Figure 10:
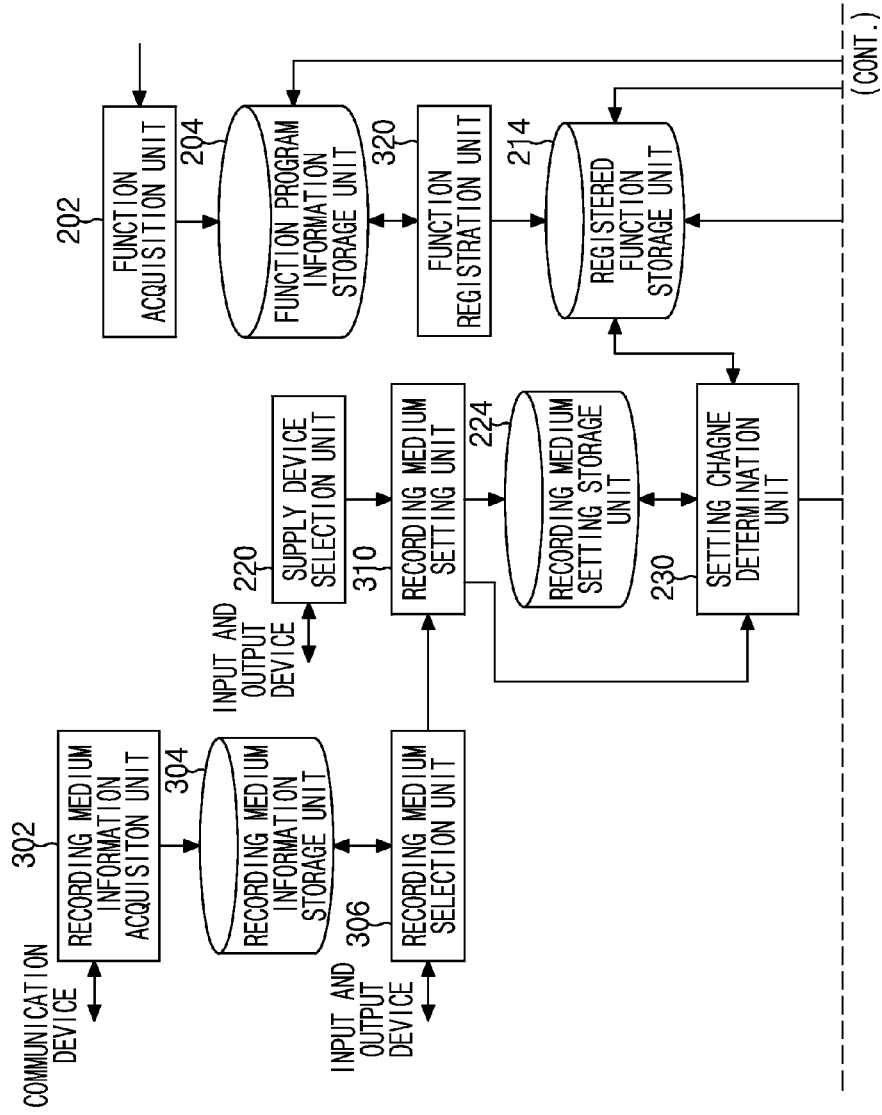
FIG. 10 is a diagram showing a configuration of an image forming program according to a second exemplary embodiment executed by the image forming apparatus shown in FIG. 1.

FIG. 10 is a diagram showing a configuration of an image forming program 30 according to a second exemplary embodiment executed by the image forming apparatus 1 shown in FIG. 1.

As shown in FIG. 10, the image forming program 30 includes the function acquisition unit 202, the function program information storage unit 204, a recording medium information acquisition unit 302, a recording medium information storage unit 304, a recording medium selection unit 306, the supply device selection unit 220, a recording medium setting unit 310, the recording medium setting storage unit 224, a function registration unit 320, the registered function storage unit 214, the setting change determination unit 230, the function execution prohibition processing unit 232, and the function execution processing unit 240.

Furthermore, description will be omitted for the same constituent elements as in the first exemplary embodiment, such as, the function acquisition unit 202, and the like (the same is applied to other constituent portions).

In the image forming program 30, the recording medium information acquisition unit 302 acquires information relating to the types of recording media shown in FIG. 11 (recording medium information) through a network by, for example, the communication device 108, and stores the information in the recording medium information storage unit 304.

Furthermore, the recording medium information acquisition unit 302 may acquire the recording medium information through a storage medium (not shown in the drawing) such as a memory card, or the like.

FIG. 11 is a diagram exemplifying the recording medium information.

As shown in FIG. 11, the recording medium information includes recording medium identification information that is identification information of the types of the recording media and recording medium attribute information corresponding to the types of the recording media.

For example, in recording medium attribute information of a recording medium "for fabric printing", the attribute "size" is "A4 size", and the attribute "material" is "fabric transfer sheet".

The recording medium selection unit 306 receives an operation of the input and output device 180 by the user, and outputs a selection result indicating the selected recording medium to the recording medium setting unit 310.

Specifically, the recording medium selection unit 306 extracts recording medium information from the recording medium information storage unit 304, and causes the input and output device 180 to display a screen for selecting the recording medium information by the user.

In addition, when the user performs an operation for selecting the recording medium information by using the screen displayed in the input and output device 180, the recording medium selection unit 306 generates the selection result including the recording medium information corresponding to the selected recording medium.

The recording medium setting unit 310 sets recording medium attributes relating to the recording medium information from the recording medium selection unit 306 for a supply unit 120 selected by the supply device selection unit 220.

In addition, the recording medium setting unit 310 stores the recording medium setting information exemplified in FIGS. 5A and 5B in the recording medium setting storage unit 224.

Furthermore, the recording medium setting unit 310 outputs the set recording medium attribute information to the function registration unit 320.

The function registration unit 320 extracts, from the function program information storage unit 240, function program information corresponding to a function program executable in regard to recording medium attributes corresponding to the recording medium attribute information from the recording medium setting unit 310.

In addition, the function registration unit 320 performs a process for registering the function program relating to the extracted function program information so that the function program is executable in the image forming apparatus 1, and stores the registered function program information shown in FIG. 4B in the registered function storage unit 214.

Furthermore, the function registration unit 320 may register the function program executable for the recording medium attributes set by the recording medium setting unit 310 through a manual operation of the input and output device 180 by the user.

When, for example, the recording medium "for fabric printing" is selected by the recording medium selection unit 306 in the example of FIG. 11, the attribute "material" is a "fabric transfer sheet" in regard to the recording medium attribute information, and this coincides with the attribute "material" in the recording medium attribute information of the function program "fabric printing" in the function program information shown in FIG. 4A.

In addition, since the attribute "size" in the recording medium attribute information of the function program "fabric printing" is "arbitrary", the scope includes the attribute "size" (A4 size) of the recording medium "for fabric printing".

In this case, the function registration unit 320 refers to the function program information shown in FIG. 4A, and determines that the recording medium attribute information relating to the function program "fabric printing" includes the recording medium attribute information relating to the recording medium "for fabric printing".

Therefore, the function registration unit 320 registers the function program "fabric printing".

FIG. 12 is a flowchart (S20) showing a process in the image forming program 30 according to the second exemplary embodiment.

Furthermore, description will be omitted for the same processes as those shown in FIG. 9.

In Step 202 (S202), the recording medium selection unit 306 receives an operation of the input and output device 180 by the user and selects a recording medium.

In Step 204 (S204), the recording medium setting unit 310 sets recording medium attributes relating to the selected recording medium by the recording medium selection unit 306 for a supply unit 120 selected by the supply device selection unit 220.

In Step 206 (S206), the function registration unit 320 registers a function program executable for the recording medium attributes set by the recording medium setting unit 310.

[Modified Example]

The function execution processing unit 240 may process a specific function program to be executed when the function execution processing unit receives designation of the specific function program from a user, and registered function program information corresponding to the designated function program is stored in the registered function storage unit 214.

In this case, since the designated function program is not registered (or deleted), when the designated function program information is not stored in the registered function storage unit 214 and when an execution prohibition flag is set to the designated function program information, the function execution processing unit 240 may cause the input and output device 180 to display a message such as "it is not executable", or the like.

In addition, when an execution prohibition flag is set to the designated function program information, the input and output device 180 may be caused to display recording medium attributes that should be set to make the function program executable.

In addition, the image forming program 20 according to the first exemplary embodiment and the image forming program according to the second exemplary embodiment may be simultaneously executed in a single image forming apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming section that forms an image on a recording medium;
    a plurality of recording medium supply sections that supply a recording medium to the image forming section;
    a recording medium attribute setting section that sets attributes of the recording medium supplied by the recording medium supply section;
    a function program registration section that makes function programs for executing processes that use processing functions relating to image formation correspond to recording medium attribute information relating to the recording medium usable for the function program and performs registration for each of the function programs; and
    a control section that controls whether or not the registered function program is executable based on the attributes of the recording medium set by the recording medium attribute setting section and the recording medium attribute information registered by the function program registration section,
    wherein the recording medium attribute setting section sets attributes of the recording medium by storing the attributes of the recording medium in a recording medium setting storage device, and
    wherein the control section controls whether or not the registered function program is executable based on the attributes of the recording medium in response to none of the attributes of the recording medium set by the recording medium attribute setting section coinciding with the recording medium attribute information relating to the registered function program.

2. The image forming apparatus according to claim 1, wherein, when recording medium attribute information indicated by the attributes set in the recording medium attribute setting section does not agree with the recording medium attribute information registered in the function program registration section, the control section prohibits the execution of the function program corresponding to the disagreed recording medium attribute information.

3. The image forming apparatus according to claim 1, further comprising:
    a function program acquisition section that acquires the function programs,
    wherein the function program registration section extracts information on attributes of a recording medium usable for the function program from the function program newly acquired by the function program acquisition section, and performs registration by making the function programs correspond to the recording medium attribute information based on information on the attributes of the recording medium.

4. The image forming apparatus according to claim 1, wherein, when a predetermined function program is registered by the function program registration section, the recording medium attribute setting section sets attributes of a recording medium usable in the predetermined function program that has been registered.

5. The image forming apparatus according to claim 1, further comprising:
    a function program selection section that selects a function program to be executed in the image forming section; and
    a notification section that, when a function program, which is controlled by the control section not to be executable, is selected by the function program selection section, provides notification of attributes of a recording medium usable in the selected function program.

6. The image forming apparatus according to claim 1, further comprising:
    a function program acquisition section that acquires the function programs,
    wherein, when it is difficult to extract information on attributes of a recording medium usable for the function program from the function program newly acquired by the function program acquisition section, the function program registration section specifies a recording medium usable for the function program by analyzing the function program, and performs registration by making the function program newly acquired by the function program acquisition section correspond to the recording medium attribute information based on the specified recording medium.

7. The image forming apparatus according to claim 1, wherein a setting section that sets in advance recording medium attribute information that the function program newly acquired by the function program acquisition section is not usable as prohibition information, and wherein the function program registration section determines recording medium attribute information that the function program newly acquired by the function program acquisition section is not usable in accordance with the prohibition information, and performs registration after excluding correspondence of the function program that has been determined to be not usable with the recording medium attribute information.

8. The image forming apparatus according to claim 1, wherein the attributes of the recording medium are stored with corresponding device supply information.

9. The image forming apparatus according to claim 1, further comprising:
a function program selection section that selects a function program to be executed in the image forming section,
wherein the function program selection excludes display of a function program which is not executable.

10. The image forming apparatus according to claim 1, wherein the attributes of the recording medium includes material information of the recording medium.

11. The image forming apparatus according to claim 1, wherein the function program is not displayed in response to the control section prohibiting the execution of the function program.

12. The image forming apparatus according to claim 1, wherein the function program is displayed separately from at least one other function program which is executable in response to the control section prohibiting the execution of the function program.

13. The image forming apparatus according to claim 1, wherein the recording medium attribute information comprises material information.

14. The image forming apparatus according to claim 1, wherein the recording medium attribute setting section sets attributes of the recording medium supplied by the recording medium supply section to correspond to respective supply identification information which identifies the recording medium supply sections.

15. A non-transitory computer readable medium storing a program that causes a computer to execute a process for an image forming apparatus, the process comprising:
setting attributes of a recording medium supplied by a plurality of recording medium supply sections that supply recording media to an image forming section that forms an image on a recording medium;
performing registration for each function program by making function programs for executing processes that use processing functions relating to image formation correspond to recording medium attribute information relating to the recording medium usable for the function program; and
controlling whether or not the registered function program is executable based on the attributes of the recording medium set in the recording medium setting and the recording medium attribute information registered in the function program registration,
wherein the setting attributes of the recording medium further comprises storing the attributes of the recording medium in a recording medium setting storage device, and
wherein the controlling whether or not the registered function program is executable based on the attributes of the recording medium occurs in response to none of the attributes of the recording medium set coinciding with the recording medium attribute information relating to the registered function program.

16. An image forming method comprising:

setting attributes of a recording medium supplied by a plurality of recording medium supply sections that supply recording media to an image forming section that forms an image on a recording medium;

performing registration for each function program by making function programs for executing processes that use processing functions relating to image formation correspond to recording medium attribute information relating to the recording medium usable for the function program; and controlling whether or not the registered function program is executable based on the attributes of the recording medium set in the recording medium setting and the recording medium attribute information registered in the function program registration, wherein the setting attributes of the recording medium further comprises storing the attributes of the recording medium in a recording medium setting storage device, and wherein the controlling whether or not the registered function program is executable based on the attributes of the recording medium occurs in response to none of the attributes of the recording medium set coinciding with the recording medium attribute information relating to the registered function program.

* * * * *